United States Patent [19]

Seto et al.

[11] Patent Number: 5,186,303
[45] Date of Patent: Feb. 16, 1993

[54] POSITIONAL DEVIATION CORRECTING METHOD FOR SUBJECT CONVEYED ON PRODUCTION LINE

[75] Inventors: Shigeo Seto, Yokohama; Tsugihiro Kurihara, Fujisawa; Hiroshi Machida; Keiji Shintani, both of Yokohama, all of Japan

[73] Assignee: Matsushita Electric Industrial Co., Ltd., Osaka, Japan

[21] Appl. No.: 796,638

[22] Filed: Nov. 22, 1991

[30] Foreign Application Priority Data

Nov. 30, 1990 [JP] Japan ................................. 2-338231

[51] Int. Cl.⁵ ............................................. B65G 14/64
[52] U.S. Cl. ................................ 198/345.1; 198/395; 198/434
[58] Field of Search .............. 198/395, 456, 434, 340, 198/341, 345.3, 345.1; 414/799

[56] References Cited

U.S. PATENT DOCUMENTS

| | | | |
|---|---|---|---|
| 3,796,327 | 3/1974 | Meyer et al. | 198/341 X |
| 3,854,889 | 12/1974 | Lemelson | 198/341 X |
| 4,014,428 | 3/1977 | Ossbahr | 198/345.3 |
| 4,435,837 | 3/1984 | Abernathy | 198/395 X |
| 4,488,633 | 12/1984 | Kampf | 198/341 |
| 4,776,080 | 10/1988 | Christensen | 29/430 |
| 4,819,784 | 4/1989 | Sticht | 198/395 |
| 4,890,715 | 1/1990 | Sticht | 198/340 |
| 5,084,829 | 1/1992 | Kato | 198/340 X |

Primary Examiner—Robert P. Olszewski
Assistant Examiner—Cheryl L. Gastineau
Attorney, Agent, or Firm—Stevens, Davis, Miller & Mosher

[57] ABSTRACT

The object of the present invention is to decrease the cost required for constructing the system and the tact time in production line. For achieving the above-mentioned object, according to the present invention, among a plurality of stations where adjustment or the like of the subject is carried out, the recognizing station, through which a pallet mounted with the subject is firstly passes, recognizes the positional deviations of the subject and stored them in a memory provided on said pallet. Next, an adjusting station reads out the above-mentioned positional deviations from the memory and added them to the predetermined standard positional information, thereby correcting the positional deviations of the subject.

9 Claims, 2 Drawing Sheets

POSITIONAL DEVIATION CORRECTING METHOD FOR SUBJECT CONVEYED ON PRODUCTION LINE

BACKGROUND OF THE INVNETION

The present invention relates to a positional deviation correcting method for a subject to be inspected, in which the positional deviations of the subject such as positional deviations of variable resistors and so on mounted on a printed circuit board are automatically detected and corrected.

Heretofore, there is known a positional deviation correcting method for a subject conveyed on a production line shown in FIG. 1. As shown in FIG. 1, a pallet 52 mounted thereon with a subject, namely a printed circuit board in this case, is conveyed on a conveyor 51. Along the conveyor line are arranged stations 53, 54, 55 and 56, and each of these stations is provided with a recognizing means for recognizing the positions of such as variable resistors, variable capacity coils, trimmer condensers and so on, and with a movable adjusting means for adjusting the positions of the above-mentioned variable resistors and so on. A standard pallet mounted with variable resistors and so on at standard positions is conveyed by a conveyor 51, and these standard positions are recognized and stored at these stations 53, 54, 55 and 56. Then, a printed circuit board, namely a subject to be inspected, is conveyed by the conveyor 51, and the actual positions of variable resistors mounted on the printed circuit board are recognized at the stations 53, 54, 55 and 56, where the recognized actual positions of the resistors are compared with the recognized standard positions of the same, and the positions of the resistors are corrected on the basis of the deviations of the actual positions from the standard positions by use of an adjusting means.

In the above prior art, however, it is required to provide a recognizing means at every station 53, 54, 55 and 56, thereby causing a problem that the cost for practicing this method becomes high and the tact time on the production line becomes long.

SUMMARY OF THE INVENTION

The present invention is intended to solve a problem of the above-mentioned kind of prior arts, and has an object to provide a positional deviation correcting method for a subject conveyed on a production line which achieves reduction of the practicing cost and shortening of the tact time.

For achieving the above-mentioned object, the method according to the present invention comprises steps of obtaining positional information of a subject mounted on a pallet which is provided with a memory and conveyed on a conveyor; obtaining deviations of the positional information from a predetermined standard positional information of the subject and storing this deviations into the memory; and reading out the deviation from the memory mounted on the conveyed pallet; and adjusting the subject by moving an adjusting means for adjusting the subject to the correct positions which are obtained by adding the deviations to the standard positional information.

As mentioned above, according to the present invention, a pallet mounted with a subject and conveyed on a production line is provided with a memory, and at the first recognizing station through which the pallet firstly passes, positional deviations of the subject deviating from the standard positions are detected and stored in the memory. At the succeeding stations, the stored deviations are read out from the memory, and the subject is positionally corrected according to the values obtained by adding the read-out deviations to the standard positional information.

Therefore, since the recognizing means for recognizing the positional information of the subject is required to be provided only at the first recognizing station, the cost of the whole system can be greatly decreased.

DETAILED DESCRIPTION OF THE INVENTION

Referring to the attached drawings, an embodiment of the present invention will be described below.

Figure 1:
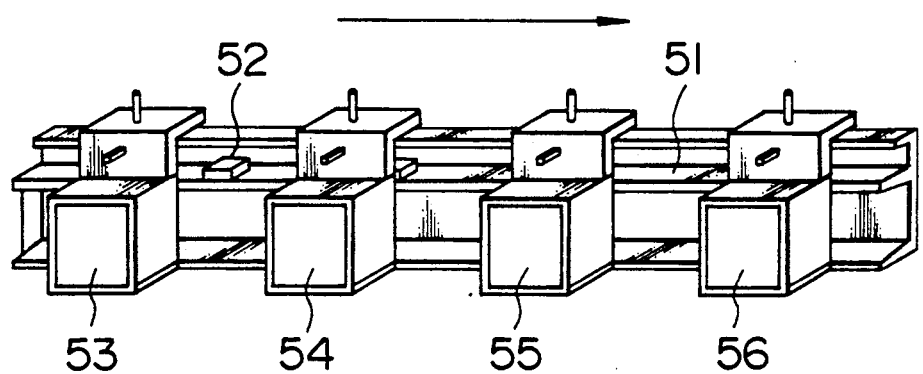
FIG. 1 is an illustration of a production line applied by a positional deviation correcting method of a prior art.
Figure 2:
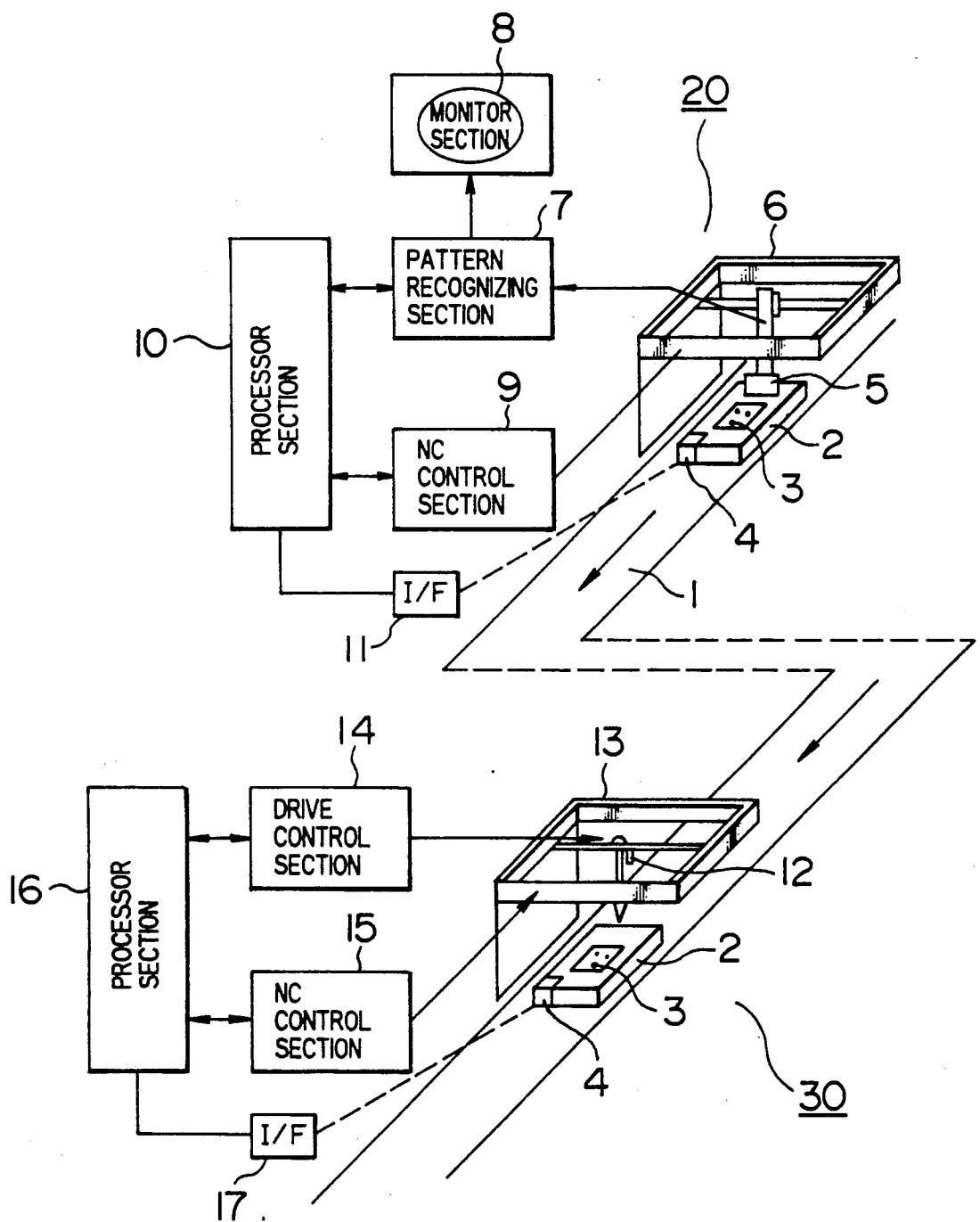
FIG. 2 is an illustration of a produciton line applied by a positional deviation correcting method according to the present invention.

In the embodiment shown in FIG. 2, there are shown only a first recognizing station and one of adjusting stations constituting a part of succeeding processes.

As shown in FIG. 2, a pallet 2 is conveyed on a conveyor 1, and the pallet 2 is fixedly mounted with a subject 3 to be inspected and provided with a memory 4 in which a positional deviation of the subject deviating from a predetermined standard positional informaiton is stored.

In the first recognizing station 20, there are provided a CCD camera 5, a X-Y moving mechanism 6 for moving the CCD camera in two direcitons perpendicular to each other, a pattern recognizing section 7 for recognizing the brightness of a variable resistor or the like mounted on the subject 3 by use of the CCD camera 5 and obtaining the positional information of the variable resistor, a monitor section 8 for indicating the position of the variable resistor or the like, a numerical control (NC) section 9 for controlling the motion of the CCD camera, a processor section 10 for picking up the positional information of the subject 3 and controlling the numerical control section 9, and an interface section 11 for transferring signals between the memory 4 and the processor section 10.

At the next adjusting station 30, there are provided an adjusting means 12 composed of a motor and a bit mechanism for adjusting the position of a variable resistor or the like on a subject 3, a X-Y moving mechanism 13 for moving the adjusting means 12 in two directions perpendicular to each other in a horizontal plane, a driving section 14 for driving the adjusting means 12, a numerical control section 15 for moving and controlling the X-Y moving mechanism 13, a processor section 16 for giving and receiving signals to and from the driving control section 14 and controlling the numerical control means 15, and an interface section 17 for transferring signals between the memory 4 and the processor section 16.

Now, the method for correcting a positional deviation on the subject will be described below.

In each of the processors 10 and 16 disposed at the first recognizing station 20 and at the adjusting station 30 succeeding thereto, respectively, there is stored standard positional information of a resistor or the like defined by a standard subject mounted on a predetermined standard pallet. In the processor 10 located at the first recognizing station 20, there is stored an positional deviation of the resistor or the like recognized by the CCD camera 5 as deviating from the position of the resistor or the like on the standard pallet.

When a subject 3 to be corrected is conveyed as mounted on the pallet 2 to the first recognizing station and stopped there, the positional information (coordinates) of the resistor or the like on the standard pallet stored in the processor 10 is given to the NC control section 9, which drives the X-Y moving mechanism 6 for moving the CCD camera 5. The CCD camera searches a variable resistor or the like aimed by the pattern recognizing section 7 and outputs the positional information (coordinates) of the resistor to the processor 10. In the processor 10, the difference between the actual position on the subject to be corrected and the standard position on the standard pallet is obtained as a positional deviation. Then, positional information relating to a nextly aimed variable resistor or the like is given to the NC control section 9 and the similar procedure is repeated successively, thereby obtaining the positional deviations of all variable resistors or the like. When the positional deviations of all resistors or the like have been obtained, the information of these deviations are stored into the memory 4 on the pallet 2 through the interface section 11.

After then, when the pallet 2 is conveyed by the conveyor 1 to the next adjusting station 30 and stopped there, the processor section 16 receives the positional deviation information relating to all variable resistors or the like from the memory 4 on the pallet 2 through the interface section 17, and adds the above-mentioned positional deviations (correction values) to the positional information of the standard pallet stored in the memory in advance.

Based on the obtained values, the adjusting means 12 is moved to a correct and precise position by the X-Y moving mechanism 13 as controlled by the NC control section 15. Then, the resistor or the like is positionally adjusted by the adjusting means 12 as controlled by the driving control means 14.

After then, the pallet 2 is conveyed by the conveyor 1 to the other adjusting stations, and at each of these stations, a similar operation is carried out for successively adjusting the position of each of resistors or the like on the subject 3.

As mentioned above, according to the above-mentioned embodiment, the correction values which are required to be obtained at all stations in prior arts are obtained as a whole at the first recognizing station 20, namely, there is required only one pattern recognizing station. As a result, there are advantages that the cost for carrying out the method is low and the tact time in production line is short, because the recognizing actions at the stations other than the first station are omitted.

Further, it may be also possible to store the positional information of the resistors or the like of a standard subject mounted on a standard pallet, similarly to in case of a subject to be inspected, in the processors 10 and 16 by conveying the standard subject on the conveyor 1, or to store point values without conveying the standard subject.

What is claimed is:

1. A positional deviation correcting method for a subject conveyed on a production line, comprising steps of obtaining actual positional information of a subject mounted on a pallet, said pallet being conveyed by a conveyor and provided with a memory, obtaining positional deviations of said actual positional information deviating from predetermined standard positional information of said subject, and storing said positional deviations in said memory, reading out said positional deviations from said memory on said pallet, and adjusting said subject by moving an adjusting means to correct positions obtained by adding said positional deviations to said standard positional information.

2. A positional deviation correcting method for a subject conveyed on a production line claimed in claim 1, wherein said positional information is obtained only at the first recognizing station on the production line.

3. A positional deviation correcting method for a subject conveyed on a production line claimed in claim 1, wherein said positional deviations are read out only at at least one recognizing station disposed downstream of said first recognizing station for adjusting said subject.

4. A positional deviation correcting method for a subject conveyed on a production line claimed in claim 1, wherein said actual positional information and said standard positional information are both expressed by use of X-Y coordinates defined in a horizontal plane.

5. A positional deviation correcting method for a subject conveyed on a production line claimed in claim 1, wherein said positional information of the subject comprises positional coordinates of a plurality of variable resistors mounted on a printed circuit board.

6. A positional deviation correcting method for a subject conveyed on a produciton line claimed in claim 5, wherein the standard positions of a plurality of variable resistors are determined in advance, and the positional deviations of the actual positions of the resistors deviating from said standard positions are obtained.

7. A production line capable of correcting positional deviations of a subject, comprising a convey means for conveying a pallet mounted with a subject on the upper surface thereof and with a memory, a recognizing station where positional deviation information of said subject mounted on said pallet deviating from predetermined standard positional information of the subject are obtained, and said positional deviation information is stored in said memory, and at least one adjusting station where said positional deviation information is read out from said memory; correct positions for the subject on the pallet are obtained by adding said read out positional deviations to said standard positions; and an adjusting means is moved to said correct positions for adjusting said subject.

8. A production line capable of correcting positional deviations of a subject claimed in claim 7, wherein said pallet is transferred to said adjusting station, after the process at said recognizing station has been completed.

9. A production line capable of correcting positional deviations of a subject claimed in claim 7, wherein said recognizing station is provided with an image picking up means for a subject, said image picking up means being movable in a horizontal plane, and with a recognizing means for recognizing the positions on said subject picked up by said image picking up means.

* * * * *